United States Patent Office 3,799,763
Patented Mar. 26, 1974

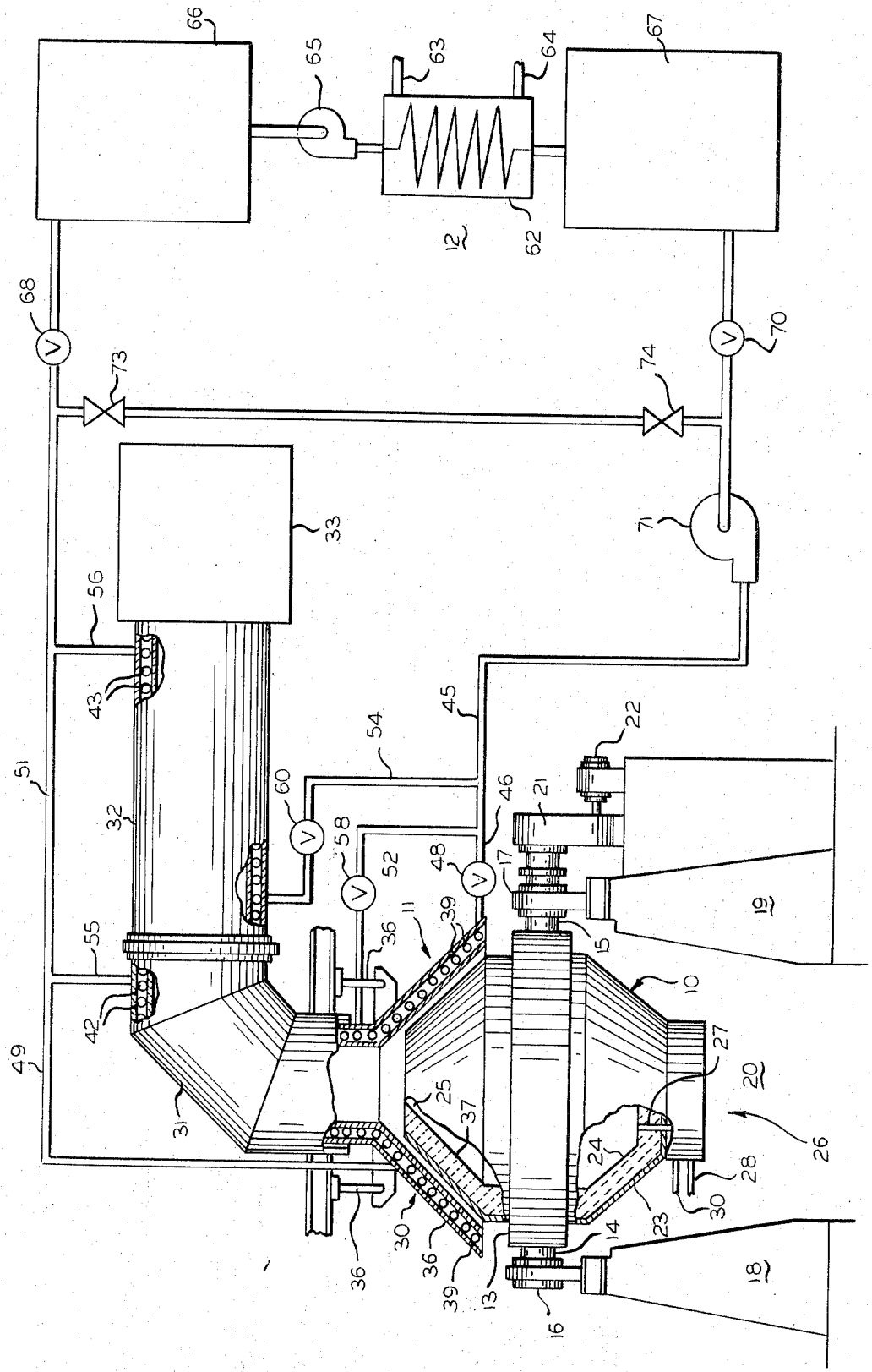

3,799,763
METHOD AND APPARATUS FOR COOLING THE EXHAUST GAS SYSTEM OF METALLURGICAL VESSELS
Alexander T. Dortenzo, Pittsburgh, Pa., assignor to Pennsylvania Engineering Corporation
Filed May 12, 1972, Ser. No. 252,917
Int. Cl. C21c 5/28, 5/40
U.S. Cl. 75—60                                      5 Claims

ABSTRACT OF THE DISCLOSURE

A method and apparatus for cooling the gas exhaust system of metallurgical vessels wherein heat is generated during only a portion of the metal treatment cycle and including first and second coolant reservoirs each having a capacity to provide sufficient cooling fluid during periods of heat generation to cool the vessel exhaust system, and a heat exchanger disposed between said reservoirs and having sufficient capacity to transfer the average amount of heat generated by the vessel during a metal treatment cycle.

BACKGROUND OF THE INVENTION

This invention relates to the cooling of gas exhaust systems of metallurgical vessels wherein an oxygen containing gas is blown into hot metal for converting the same to steel.

In a typical process of producing steel in a converter, the vessel is initially charged with molten pig iron and/or scrap. Oxygen or an oxygen containing gas is blown into the metal which results in an exothermic reaction between the oxygen and carbon, silicon, manganese, and phosphorous, which may be dissolved in the molten metal. During the treatment period, additives such as lime, may be fed into the hot metal. After the oxygen blow is complete, there may be a period of final adjustment, after which the slag is removed and the steel tapped from the vessel. The process may then be repeated.

The typical conversion cycle, which includes charging, oxygen blowing, final adjustment, deslagging and tapping, may take approximately one hour. The oxygen blow, during which substantially all of the heat generated in the vessel is produced, generally has a duration of approximately 12–14 minutes. In a typical 200 ton bottom blown vessel, the heat generated during the oxygen blow will be at the rate of approximately 400,000,000 B.t.u./hr. Thus, the gas exhaust system which removes the hot gases discharged from the vessel is subjected to an extremely high rate of heat generation during the oxygen blow period, while the heat generated during other portions of the treatment cycle is substantially nil.

Conventional gas exhaust systems for steel converter vessels generally include cooling systems, which may, for example, circulate cooling water between the gas exhaust system and a heat exchanger. In prior cooling systems of this type, heat exchangers were provided having a capacity sufficiently large to remove heat at substantially the same rate it is generated during the oxygen blowing period.

SUMMARY OF THE INVENTION

A general object of the present invention is to provide a new and improved cooling method and apparatus for the exhaust gas system of metallurgical vessels.

A further object of the present invention is to provide a cooling method and apparatus for the gas exhaust apparatus of metallurgical vessels which permits the use of a heat exchanger having a substantially smaller capacity than in prior art systems.

How the foregoing and other more specific objects are achieved will appear from time to time throughout the course of a description of a preferred embodiment of the invention which will be set forth hereinafter.

Briefly stated, the invention comprises a cooling method and apparatus for the gas exhaust system of a metallurgical vessel and including a cooling fluid circulating system having first and second reservoir means each having a capacity to substantially hold sufficient cooling fluid for a vessel cycle, a heat exchange means disposed between the reservoirs and having sufficient capacity to cool the fluid reservoir during a vessel metal treating cycle, and means for transferring cooling fluid from the reservoirs through the gas exhaust system at a first rate during the period of oxygen blow and for circulating cooling fluid through the heat exchange means at a second lower rate during the entire treatment cycle.

DESCRIPTION OF THE DRAWING

The single figure of the drawing schematically illustrates a cooling system according to the invention for the gas exhaust apparatus of a metallurgical vessel.

DESCRIPTION OF THE PREFERRED EMBODIMENT

The apparatus, according to the preferred embodiment of the invention, is schematically illustrated in the drawing to include a metallurgical vessel 10 having a gas exhaust apparatus 11 and an exhaust apparatus cooling system 12. While the illustrated vessel 10 is of the bottom blown type, it will be appreciated that the invention is applicable to any type of metallurgical vessel having a cooled gas exhaust system.

Vessels 10 may be mounted in any suitable manner, such as by a trunnion ring 13 from which trunnion shafts 14 and 15 extend laterally along a common axis. Shafts 14 and 15 may be respectively journaled in bearing supports 16 and 17 which may be supported on structural footings 18 and 19 so as to define a pit 20 below vessel 10. Trunnion ring 13 is adapted to be turned about the axis of shafts 14 and 15 for pivoting the vessel 10 through 360°, if desired. As those skilled in the art will appreciate, the vessel may be tilted by a drive mechanism which includes a reduction gear system, not shown, but disposed within housing 21 and a tilting drive motor 22 associated therewith.

Vessel 10 has an opening or mouth 25 at its upper end and may include a metallic shell 23 and a refractory lining 24. The illustrated vessel 10 is of the bottom blown type and accordingly includes a suitable gas delivery system 26 which may comprise one or more tuyeres 27 extending through the refractory lining of the vessel. Each tuyere 27 may include a pair of concentric pipes, only the outer one of which is shown in the drawing. The inner pipe is provided for the delivery of oxygen and is coupled to oxygen delivery pipe 28 and an outer concentric pipe is provided for a shielding gas, such as propane, and is connected to delivery pipe 30.

The gas exhaust system 11 includes a gas collecting hood 30 which is disposed above the mouth 25 of vessel 10 and includes a hollow conical portion which is adapted to contact mouth 25 so that there is practically no leakage of noxious gases from the vessel 10 to the atmosphere. The hood 30 telescopingly engages the lower end of an elbow 31 which in turn is connected to a horizontal pipe section 32. When vessel 10 is operating, pipe 32 is connected to gas cleaning apparatus designated generally by the reference numeral 33. As those skilled in the art will appreciate, hood 30 may be raised by suitable screw jacks 36 to telescope over the lower end of elbow 31 and thereby permit the tilting of the vessel 10 so that the latter may be charged or emptied as the requirements of the steel conversion process dictate. The details of the gas cleaning apparatus 33 form no part of the invention and accordingly will not be discussed in detail.

The hood 30 includes spaced apart walls 36 and 37 which may be of any suitable metallic material and between which is disposed suitable piping 39 for carrying a cooling fluid such as water. The elbow 31 and the pipe 32 similarly include a double wall construction for respectively containing cooling water pipes 42 and 43. The hood 30 cooling pipes 39 are connected to the cooling system 12 main supply pipe 45 by an inlet pipe 46 and a regulating valve 48. An outlet pipe 49 connects cooling pipes 39 to the cooling system 12 return pipe 51. The elbow 31 and exhaust pipe 32 are similarly connected to the cooling system 12 respectively by inlet pipes 52 and 54 and outlet pipes 55 and 56 and valves 58 and 60.

The cooling system 12 includes a heat exchanger 62 which may be of any well-known type in which the cooling fluid from the vessel gas exhaust system is passed in heat exchange relation with a cooling medium. For example, the cooling medium may also be water which is supplied to heat exchanger 62 through pipes 63 and 64. A first reservoir 66 is connected to the inlet end of heat exchanger 62 by a pump 65 and a second reservoir 67 is connected to the outlet of heat exchanger 62. The inlet of reservoir 66 is connected to the cooling system return pipe 51 by valve 68 and the outlet of reservoir 67 is connected to the cooling system pipe 45 by valve 70. A main feed pump 71 is disposed in feed line 45 for pumping cooling fluid from reservoir 67, through pipes 39, 42 and 43 in exhaust system 11 and to the reservoir 66. A bypass conduit 72 may be coupled between pipes 45 and 51 by valves 73 and 74. The reservoirs 66 and 67 will each normally be sized to contain sufficient fluid to cool the total heat output of vessel 10 during one operating cycle. According to the preferred embodiment of the invention, the heat exchanger 62 has a sufficient capacity to cool the cooling fluid in reservoir 66 at a rate substantially equal to the average rate of heat output from vessel 10.

When vessel 10 is to be charged, the hood 30 is raised and the vessel 10 tilted through a suitable angle to permit molten pig iron and/or scrap to be charged through the mouth 25. The vessel 10 will then be returned to its vertical position and the hood 30 lowered into position. After vessel 10 has been charged with scrap, hydrocarbon gas and oxygen may be delivered through tuyere 27 for preheating. After the initial preheat period, the period of the main blow will commence. During this period, oxygen will be delivered through the inner portion of tuyere 27 to react with the carbon, phosphorous, sulphur and other impurities which may be dissolved in the molten metal in vessel 10. A hydrocarbon gas is delivered through the outer portion of tuyere 27 to protect the refractory bottom of the vessel and powdered lime may be entrained in the gas stream to prevent slopping of the metal from vessel 10. During this main blow, smoke, carbon dioxide, carbon monoxide, sulphur dioxide and other fumes evolve from the top mouth 25 of vessel 10 and pass into the gas cleaning system 33 through hood 30, elbow 31 and conduit 32. After the main blow, there may be a period of final adjustment and vessel turndown during which only inert gases will generally be delivered through tuyeres 27. After conversion of the hot metal has been completed, the hood 30 will be raised after which the vessel 10 will be tilted to discharge slag into a slag pot (not shown). Finally, the hot metal will be discharged into a ladle (not shown) and the process may be repeated.

In order to properly cool gas exhaust system during the periods when heat is generated in vessel 10, the pump 71 will be actuated when required. Reservoir 67 will contain sufficient cooling for a complete cycle of vessel 10 and this will begin flowing through the cooling pipes 39, 42 and 43 of the exhaust system 11 when pump 71 is actuated. After circulating through the cooling pipes 39, 42 and 43, the heated liquid flows through return pipe conduit 51 to the first reservoir 66. Meanwhile, pump 65 is operating to deliver the heated liquid from the reservoir 66 to heat exchanger 62 for cooling before the same is discharged back into reservoir 67.

Heat will be generated in vessel 10 primarily only during periods of the oxygen blow. During such periods, the exhaust gases exiting to the hood 30 are at a temperature in the order of 1400°–1600° C. When the vessel 10 is being charged, and during short waiting periods, and periods of desulphurization, vessel upturn, hydrogen removal, recarburization, vessel downturn, deslagging and pouring, inert gases such as argon or nitrogen may be blown into the vessel through tuyeres 27. During these periods of inert gas blow, little or no heat is generated in vessel 10. For a complete treating cycle, the main blow may last for approximately 12–14 minutes out of a total cycle time of one hour. Thus, while the maximum rate of heat generation may be approximately 400,000,000 B.t.u./hr. During the period of the main blow for a 200 ton vessel, the average rate of heat generation over an entire treating cycle is only approximately 80,000,000 B.t.u./hr. According to the preferred embodiment of the invention, the heat exchanger 62 has a capacity equal to the average rate of heat generation over a cycle of vessel 10 rather than a capacity equal to the maximum rate. In the illustrative example, therefore, heat exchanger 62 would have a capacity of about 80,000,000 B.t.u./hr. Because the exhaust system 11 requires cooling water at a faster rate than can be cooled by heat exchanger 62, reservoir 67 will initially contain sufficient cooling fluid for a complete cycle of vessel 10. Most of this fluid will be passed through the exhaust apparatus cooling system and passed to reservoir 66 during periods of peak heat generation in vessel 10. By the time the vessel 10 cycle has been completed, substantially all of the liquid in reservoir 66 will have been properly cooled by heat exchanger 62 and transferred back to reservoir 67 for the next cycle of vessel 10.

The main feed pump 71 is adjusted to deliver cooling fluid from reservoir 67 at a sufficiently high rate to cool the exhaust system. The pump 65 is adjusted and arranged to deliver the cooling fluid from reservoir 64 to the heat exchanger 65 at a lower rate which will permit the heat exchanger to sufficiently cool the cooling fluid prior to its circulation to reservoir 67. Normally, fluid will be circulated from reservoir 67 through the exhaust system during the main blow. During other portions of the treatment cycle, when little or no heat is generated in vessel 10, cooling fluid will be circulated through the exhaust system 11 at a slower rate or it may be circulated through the bypass 72.

Although the system has been described with regard to a bottom blown converter vessel, those skilled in the art will appreciate that the method may be applied in connection with other types of metallurgical vessels wherein heat is generated intermittently, such as, top and side blown converter vessels, electric arc furnaces, and the like. Accordingly, the scope of the invention is to be determined only by the scope of the appended claims.

What is claimed is:

1. In a method of processing molten metal in a metallurgical treating zone over a treatment cycle having substantial duration,
blowing an oxygen containing gas into said metal during said treatment cycle, the period of said oxygen containing gas blow being substantially shorter than the period of said treatment cycle, said oxygen reacting exothermically with dissolved impurities in said molten metal to generate substantial heat during the blowing of said oxygen containing gas, the heat generated during other portions of said treatment cycle being substantially insignificant,
conducting gaseous pollutants from the metallurgical treating zone by means of a gas collecting hood,
the improvement comprising,
containing cooling fluid in a first reservoir,
circulating said cooling fluid from said first reservoir in a heat exchange relation with said gas collecting hood and at a first rate during periods of oxygen blowing in said vessel, collecting heated cooling fluid in a second reservoir after passage from said gas collecting hood, passing said cooling fluid from said second reservoir to said first reservoir through a cooling zone during substantially said entire treatment cycle and at a substantially lower rate than said first rate.

2. The method set forth in claim 1 and including the step of containing a sufficient quantity of cooling fluid in said first reservoir to cool said gas collecting hood during an entire treatment cycle.

3. The method set forth in claim 2 and including the step of removing heat from said cooling fluid in said cooling zone at a substantially lower rate than heat is generated in said metallurgical treatment zone during the blowing of said oxygen containing gas.

4. The method set forth in claim 3 and including the steps of bypassing cooling fluid around said first and second reservoir and said cooling zone during the portion of said treatment cycle when oxygen containing gases not being blown into said metallurgical treating zone.

5. The method set forth in claim 3 wherein a quantity of cooling fluid passed from said second reservoir through said cooling zone and to said first reservoir is substantially equal to that circulated from said first reservoir to said gas collecting hood during said periods of oxygen blowing.

References Cited
UNITED STATES PATENTS

| | | | |
|---|---|---|---|
| 3,314,781 | 4/1967 | Johansson | 75—60 |
| 3,057,616 | 10/1962 | Wohlfahrt | 75—52 |
| 3,271,130 | 9/1966 | Denig | 75—60 |
| 3,011,966 | 12/1961 | Jahnentz | 75—60 |
| 3,177,065 | 4/1965 | Okaniwa | 75—60 |
| 3,173,489 | 3/1965 | Okaniwa | 75—60 |
| 3,134,835 | 5/1964 | Okaniwa | 75—60 |
| 3,059,913 | 10/1962 | Sands | 75—60 |
| 3,357,820 | 12/1967 | Rasworschegg | 75—60 |
| 3,028,231 | 4/1962 | Klemantaski | 75—26 |

L. DEWAYNE RUTLEDGE, Primary Examiner

P. D. ROSENBERG, Assistant Examiner

U.S. Cl. X.R.

266—35